US007779033B2

(12) United States Patent
Winzenried et al.

(10) Patent No.: US 7,779,033 B2
(45) Date of Patent: Aug. 17, 2010

(54) METHOD FOR CONTROLLING A DATA PROCESSING DEVICE

(75) Inventors: Oliver Winzenried, Karlsruhe (DE); Marcellus Buchheit, Karlsruhe (DE); Ralf Fust, Karlsruhe (DE)

(73) Assignee: Wibu-Systems AG, Karlsruhe (DE)

( * ) Notice: Subject to any disclaimer, the term of this patent is extended or adjusted under 35 U.S.C. 154(b) by 0 days.

(21) Appl. No.: 10/584,806

(22) PCT Filed: Dec. 30, 2004

(86) PCT No.: PCT/EP2004/014838

§ 371 (c)(1),
(2), (4) Date: Jun. 28, 2006

(87) PCT Pub. No.: WO2005/064480

PCT Pub. Date: Jul. 14, 2005

(65) Prior Publication Data

US 2007/0186037 A1 Aug. 9, 2007

(30) Foreign Application Priority Data

Dec. 30, 2003 (EP) .................................. 03029967

(51) Int. Cl.
*G06F 7/00* (2006.01)
*G06F 17/30* (2006.01)
(52) U.S. Cl. .................... 707/781; 707/782; 719/313; 719/319
(58) Field of Classification Search ........................ None
See application file for complete search history.

(56) References Cited

U.S. PATENT DOCUMENTS 4,096,567 A * 6/1978 Millard et al. ................ 707/10

| 5,379,423 | A | * | 1/1995 | Mutoh et al. | ................. 707/204 |
| 5,388,219 | A | * | 2/1995 | Chan et al. | ..................... 710/5 |
| 5,542,023 | A | * | 7/1996 | Sakai et al. | ............. 715/500.1 |
| 5,566,331 | A | * | 10/1996 | Irwin et al. | ................... 707/10 |

(Continued)

FOREIGN PATENT DOCUMENTS

WO   WO 2004086363 A2   10/2004

(Continued)

OTHER PUBLICATIONS

Flash Management Software: When, Why and Which?, White Paper, copyright 2003, 8 pp., M-Systems, Inc., Newark, CA, USA.

*Primary Examiner*—Mohammad Ali
*Assistant Examiner*—Angelica Ruiz
(74) *Attorney, Agent, or Firm*—Gardere Wynne Sewell LLP; Marc A. Hubbard

(57) ABSTRACT

A method for controlling a data processing device connected to a computer via an interface wherein a device specific command is generated on the computer by an application program, the command is stored in a special file and is then transmitted by the computer to the device with the aid of a write instruction of the computer operating system. The special file is received by the device, the device specific command is read out from the special file and the device processor executes the command. The method allows the device processor to execute a device specific command exclusively using the write instruction of the computer's own operating system without requiring particular administrator rights.

27 Claims, 3 Drawing Sheets

U.S. PATENT DOCUMENTS

| | | | |
|---|---|---|---|
| 5,640,596 A * | 6/1997 | Takamoto et al. | 710/21 |
| 5,701,502 A * | 12/1997 | Baker et al. | 709/201 |
| 5,752,060 A * | 5/1998 | Yoshida | 707/10 |
| 5,861,890 A * | 1/1999 | Sakai et al. | 345/619 |
| 6,199,137 B1 * | 3/2001 | Aguilar et al. | 710/305 |
| 6,260,011 B1 * | 7/2001 | Heckerman et al. | 704/235 |
| 6,338,072 B1 * | 1/2002 | Durand et al. | 707/205 |
| 6,351,850 B1 * | 2/2002 | van Gilluwe et al. | 717/175 |
| 6,363,462 B1 * | 3/2002 | Bergsten | 711/162 |
| 6,468,160 B2 * | 10/2002 | Eliott | 463/43 |
| 6,473,829 B1 * | 10/2002 | Dahman et al. | 711/112 |
| 6,535,518 B1 * | 3/2003 | Hu et al. | 370/401 |
| 6,671,747 B1 * | 12/2003 | Benkual et al. | 710/1 |
| 6,862,708 B1 * | 3/2005 | Higginbotham et al. | 715/500 |
| 6,868,506 B2 * | 3/2005 | Gagne et al. | 714/6 |
| 6,973,533 B2 * | 12/2005 | Dahman et al. | 711/112 |
| 7,039,727 B2 * | 5/2006 | Camara et al. | 710/5 |
| 7,337,264 B2 * | 2/2008 | Iida et al. | 711/4 |
| 2002/0001100 A1 * | 1/2002 | Kawanabe | 358/1.15 |
| 2002/0077177 A1 * | 6/2002 | Elliott | 463/40 |
| 2002/0154645 A1 * | 10/2002 | Hu et al. | 370/401 |
| 2002/0178304 A1 * | 11/2002 | Camara et al. | 710/11 |
| 2003/0028731 A1 * | 2/2003 | Spiers et al. | 711/147 |
| 2003/0056060 A1 * | 3/2003 | Hertz et al. | 711/112 |
| 2003/0074569 A1 | 4/2003 | Yamauchi et al. | |
| 2003/0088868 A1 | 5/2003 | Chang et al. | |
| 2003/0208564 A1 * | 11/2003 | Miyake et al. | 709/219 |
| 2003/0210585 A1 * | 11/2003 | Bernardi et al. | 365/200 |
| 2003/0217119 A1 * | 11/2003 | Raman et al. | 709/219 |
| 2004/0054894 A1 * | 3/2004 | Lambert | 713/165 |
| 2004/0098596 A1 | 5/2004 | Elteto et al. | |
| 2004/0988596 | 5/2004 | Keine | |
| 2005/0198436 A1 * | 9/2005 | Iida et al. | 711/114 |
| 2005/0228948 A1 * | 10/2005 | Mikuma et al. | 711/114 |
| 2007/0233910 A1 * | 10/2007 | Paley et al. | 710/36 |

FOREIGN PATENT DOCUMENTS

WO    WO-2005064480 A3    7/2005

* cited by examiner

METHOD FOR CONTROLLING A DATA PROCESSING DEVICE

BACKGROUND OF THE INVENTION

The present invention relates to a method for controlling a data processing device that is connected to a computer via an interface. Standard computer operating systems prevent direct access by application programs to existing hardware or attached devices. Typically, the operating system manages the hardware and the devices and makes available operating functions to the application program for its use. This is done for the reasons of stability and security. In this way, it is impossible, for example, to incorrectly write the contents of mass-storage devices, for example, a hard drive, through an incorrectly operating application program.

Specific operations and commands, like the direct access to a device, for example, via "SCSI pass-through" or "USB low-level" connections, are restricted. Either access is reserved for the administrators of the operating system or access is controlled and monitored by special device drivers. However, device drivers can be installed on the computer only with administrator rights of the operating system.

These restrictions have a disadvantageous effect for the normal user who would like to access and use a device. When a typical user connects a device to a computer, he always requires administrator rights to be able to access the device; this is applicable at least at the first access, when the special device driver is to be installed and started for the first time. However, most users are not given these administrator rights. Even for publicly accessible computers or computers installed in a company-wide network, the rights of normal users or guest users are strictly limited. Thus, the access and use of devices which are connected to a computer via an interface are also automatically limited.

For access to files, however, usually no administrator rights are required. To write or save a file onto an internal or external storage medium or to read or restore the file from this storage medium, the access rights of a normal user, usually even the rights of a guest user, are sufficient. This is applicable especially when the user himself is the owner of the storage medium.

However, usually the normal user is not permitted to execute other computer commands besides writing or reading from files. The greater the engagement of the computer command to be executed to the contents of the hardware or connected devices and the more the command engages the file management system of the computer, the more exclusive is the execution of such a command. Only persons with special rights can execute such commands; certain critical commands are even reserved exclusively to the administrator.

Thus, there can be accomplished task of communicating through a computer with a connected data processing device and allowing commands and instructions to be executed on this computer, without expanding or changing the operating system of the computer or without installing a special driver, which first makes the access to the connected device possible.

SUMMARY OF THE INVENTION

A method according to the invention for controlling a data processing device, which is connected to a computer via an interface, includes the following steps: generating a device-specific command by an application program, which is installed and executed on the computer, storing the command in a special file, and transmitting the special file from the computer to the device by means of the write command of the operating system of the computer. The special file is received by the device. The device-specific command is read from the special file. As the last step, the command is executed by the processor of the device.

The command generated by the application program can be, for example, a control command for the device or a polling of the device status. The command is packed in a "file," which is transmitted to the connected device via the typical write command of the computer. Thus, the operating system of the computer is "tricked" into thinking that a storage medium is present on its interface. The computer or its operating system "sees" in the connected device a storage medium, for example, a hard drive, even when a storage medium is not actually present.

The execution of a write command of the operating system is possible, because the external device simulates a storage medium with a corresponding file system and the operating system of the computer cannot distinguish between the simulated file system of the device and an actually connected mass-storage device. Thus, it is possible to "store" files on the apparently present storage medium by means of the operating system-specific write command, although in actuality no mass-storage device is connected at all and the files are only transmitted to the device to allow the packed command to be executed.

Because only the operating system-specific write command is used according to the invention, the connected device can be accessed without installing additional driver software. Consequently, no special user rights or even administrator rights are even necessary to control the connected external device. The write command of the operating system can be executed by any normal user without special access rights. Normal users or guest users can simply execute the application program on the computer and in this way transfer the special file to the device in order to execute a command there.

The application program on the computer packs or hides the device-specific command to be executed in a normal data file. The file is a file that is to be stored at a logical block address in the file system of a device or storage medium. The special file should be stored at a certain but flexible memory location. Not the command itself, but instead the special file is then transferred to the device. Thus, a type of tunneling takes place with the use of the write command of the operating system. The actual command is unknown to the operating system of the computer. The operating system sees only a data file that is to be stored on an only apparently available storage medium.

The processor of the connected device reads the device-specific command to be executed from the special file. The transferred command is then interpreted and executed by the processor. In this way, a device-specific command can be executed in a connected device without special rights having to be made available to the user of the computer, because from the viewpoint of the computer, only an operating system-specific normal write command is executed on a device which belongs to the user.

According to the interface that is used, the device can have the shape, for example, of a USB stick or a dongle. The device can be suitable, for example, for checking software licenses for certain application programs, pieces of music, or films on the computer. In this case, the application program sends a request to the connected device to determine whether a license for the program to be executed, the piece of music, or the film is present. The license is stored in a device-specific format, so that the information on the presence of a valid license can be polled only by means of a device-specific command. The user himself has no access to the license stored in the device. Therefore he can neither change nor manipulate the license. In this way, a simple, secure, and robust licensing of software, audio, or video data is possible. Also, licenses of different application programs on a device can be stored and cryptographic commands for further protection of the programs and data can be executed.

However, the device can also be an arbitrary controller, for example, for controlling a heating system, a sound system, a lighting system, or the like.

The device can be connected not only via a USB interface to the computer, but also via any arbitrary interface. For connection, a suitable interface is also an SCSI interface, Firewire interface, infrared interface, or the like. It is also possible to connect the device to an internal interface and to integrate the device with the computer.

In addition, the connected device can also provide a mass-storage device. In this case, conventional files or data sets can also be stored on the device in the mass-storage device. The device must then decide for a received file whether it is a normal data file that is to be stored in the mass-storage device of the device or whether the transmitted file is a special file with an embedded command. This differentiation is usually possible in that the special file is stored at a certain but flexible memory location when it contains a device-specific command. The file then has a special address as a logical block address and is apparently stored in a certain location of the logical block system. If the special memory location is not indicated, the file is treated as a conventional data file and stored on the allocated block of the mass-storage device. This is executed by the file management system present on the device. Alternatively, the special file could also be stored at a fixed memory location.

In a special configuration of the method according to the invention, the device-specific command is executed only when the special file contains identification. The identification can exist in the form of a flag, a parameter, or an ID. If a certain ID is set in the special file, then in the device it is recognized that a command stored in the file is to be executed. The identification is used for an additional release for the execution of the command. If the identification is not present, e.g., a certain ID is not set, the execution of the command by the processor in the device is blocked.

If the special file contains no identification, the file can be stored at a predetermined location in the logical block system. The memory location can then be the RAM of the device or also a non-volatile memory, usually the data memory of the device, in which certain data of the controller can also be stored. Thus, a special file can be protected in a device. If the special file is stored in non-volatile memory, it remains protected in the device even when the device is no longer connected to the computer. Thus, protection of a backup of the special file can be performed in the device.

In the course of the method according to the invention, an answer to the executed command can be generated by the processor of the device. If the command to be executed is not a pure control command, but instead, for example, adjustment is to be performed or a query is to be executed, then the result of the execution of the command is an answer. The answer can include, e.g., a current measurement value or a confirmation of the execution of the command. The result of a query can be, for example, the status of the device. If the device is used for the licensing of software, then the answer is also the result of a query. The answer then contains either the license itself or, for the presence of a license, the release for the execution of the software. In the same way, the answer can include the result of a cryptographic command.

Preferably, according to the method according to the invention, a status flag or tag can be set by the processor in RAM memory or written into the special file in non-volatile memory, with reference to which an answer to the executed command is generated for the next access to the file. The answer is then generated only when another access to the file takes place at a later time, thus the computer queries the answer from the device. Thus, it is guaranteed that only a current answer to a preceding command is always transmitted. This is important, for example, when the command to be executed sets a regulation in motion, in which a desired value is to be regulated. As an answer, the current control parameter can be returned, which naturally is interesting not at the beginning of the regulation, but instead only at a later point in time. The point in time can be determined by the application program on the computer, in which the file apparently stored in the device is accessed.

If the answer is generated immediately after execution of the command, it can be buffered in a non-volatile memory of the device. It remains available there until the application program accesses the file in the device again by another write or read command. A flash storage device, a ROM, an EEPROM, a flash memory, or the like can be provided in the device as the non-volatile memory.

In an especially preferred way, the method according to the invention features additional steps for transmitting the answer: a read command of the operating system concerning the special file is sent by the computer to the device. The read command is received in the device. In another step, the answer generated for the executed command is stored in a special file. The special file can be buffered in the RAM or in the non-volatile memory of the device. The special file is modified in this way. In the next step, the special file is returned from the device to the computer in the execution of the read command.

The communications between the computer and the device take place by means of the read command implemented in the operating system of the computer. Because the device itself cannot initiate a transmission of a file or an answer, the computer or the application program executed on the computer must trigger the reading of the special file. For executing the read command of the operating system, in turn, no special rights are required.

The processor of the device receives the read command and recognizes that the special file is to be read back. In contrast to the reading of a normal data file, now the unchanged file is not sent back. Instead, the processor determines the answer generated by the executed command and creates a sequence corresponding to that of a file. Alternatively, a sequence corresponding to that of a special file can also be created from the answer. Instead of the reading and return of an (unchanged) file, the answer to the executed command is stored temporarily in a buffer memory. In this case, the processor accesses this buffer memory and reads the answer. If, for example, a license is requested as the answer, then the license data is generated only when transmitting back from the processor of the device and written into the special file.

Advantageously, the processor recognizes that a command has been executed when the special file is written in the device. Preferably, the execution of the command is recognized, such that there is an identification in RAM or in the special file. This can be, for example, a set flag, a tag, or a certain bit in the special file. If the identification is not present in the special file, the processor recognizes when the read command is executed that no answer was generated. In this case, the file involves protection or backup of the special file that is to be restored.

If the processor of the device recognizes that the file to be read is not a special file, but only a normal data file, then this file is sent back unchanged.

In an especially preferred configuration, the method according to the invention further has the following steps: receiving the special returned file on the computer. Subsequent recognition by the application program if the special file contains an answer. In addition, the answer is read from the file and processed further in the application program. The application program recognizes that a special file was returned from the device. Here, it distinguishes between a special file and a normal file. If a special file was returned, the application program recognizes that the file contains an identification, which was stored in the file by the processor of the device in common with the answer.

The application program on the computer recognizes that the rewritten special file contains the answer to the executed command. If an answer was stored in the special file by the processor of the device, a flag is also simultaneously set by the processor. This flag can be provided in the form of a status bit or an ID in the file. The application program identifies this flag and determines that an answer was returned by the processor of the device. The answer is then further processed accordingly in the application program.

If a special file is read back without a flag, then the application program recognizes that the special file does not contain an answer. In this case, merely a special file stored on the device is read back unchanged.

In a special application of the method according to the invention, the answer to the executed command is a device status or an error message. The device status is returned as the answer when a corresponding request was transmitted to the device. This information can then be important when regulation is to be triggered in the device and the actual current value of the control parameters must be determined in advance. Also, if the device can assume different statuses, information on the current device status is important. The application program can execute further routines based on this information and send commands dependent on the status to the device.

Likewise, the answer can consist of result data of a cryptographic command.

The answer is an error message when an error occurs in the device during the execution of the previously transmitted command or the command was not processed or the execution of the command was interrupted. Then the application program can resend a command to the device or interrupt the processing of a routine.

The present invention is explained in more detail with reference to the following figures and wherein a preferred embodiment is also described in the drawings.

DETAILED DESCRIPTION OF A PREFERRED EMBODIMENT

Figure 1:
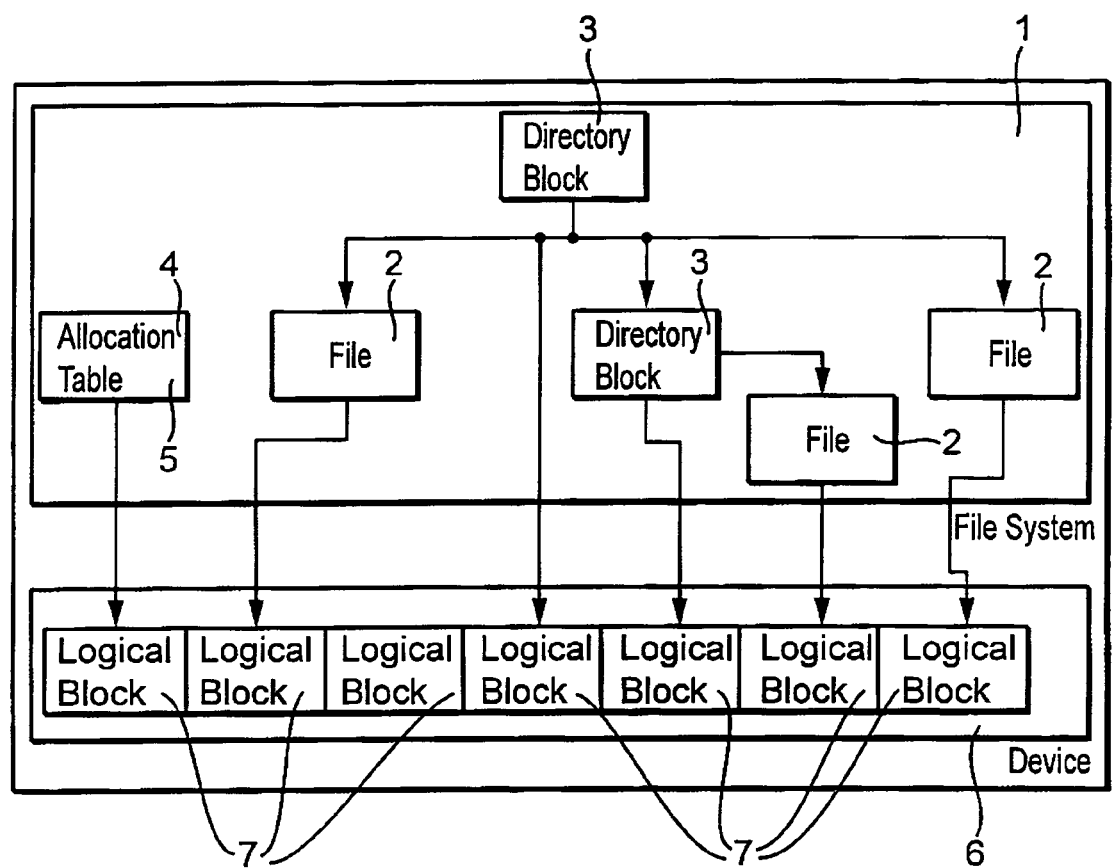
FIG. 1 illustrates the file systems of a computer and a connected data-processing device.

FIG. 1 shows the file system of the computer 1 as it is presented to the user or to the operating system of the computer 1. The data stored in a file 2 is organized into a hierarchical tree structure. The individual files 2 are allocated to folders 3, so-called directory blocks. Additionally, the file system of the computer 1 has an allocation table 4 in which information on the physical memory location is stored. The allocation table 4 contains the logical block addresses 5 (LBA). The file system accesses the block address 5 in order to write data onto a storage medium or to read data from the medium.

A data processing device 6 is connected to the computer 1 via an interface. The computer 1 recognizes that the device 6 is a storage medium. The file system of the computer 1 stores data on the device 6 in a continuous list of data blocks 7, which are specified with logical block addresses 5. The data block 7 typically has the length of a physical sector or is a multiple of this length. However, the length is fixed for the file system.

So that the computer 1 can store a file 2 on a device 6, the hierarchical structure of its file system must be converted to the block structure of the memory system of the device 6. This conversion is performed by means of additional management information, which is also stored in the allocation table 4. When accessing a storage medium, the file system has the authorization to allocate a certain block address 5 to a file 2. The allocation is also stored in the allocation table 4.

The file system is part of the operating system of the computer 1 and implemented as software. The device 6 itself can process only the continuous list of data blocks 7 and execute the data block-based write or read commands which it receives as the specific logical block address 5 for access. The data is merely read or written. The device 6 does not analyze or interpret the data contents.

Figure 2:
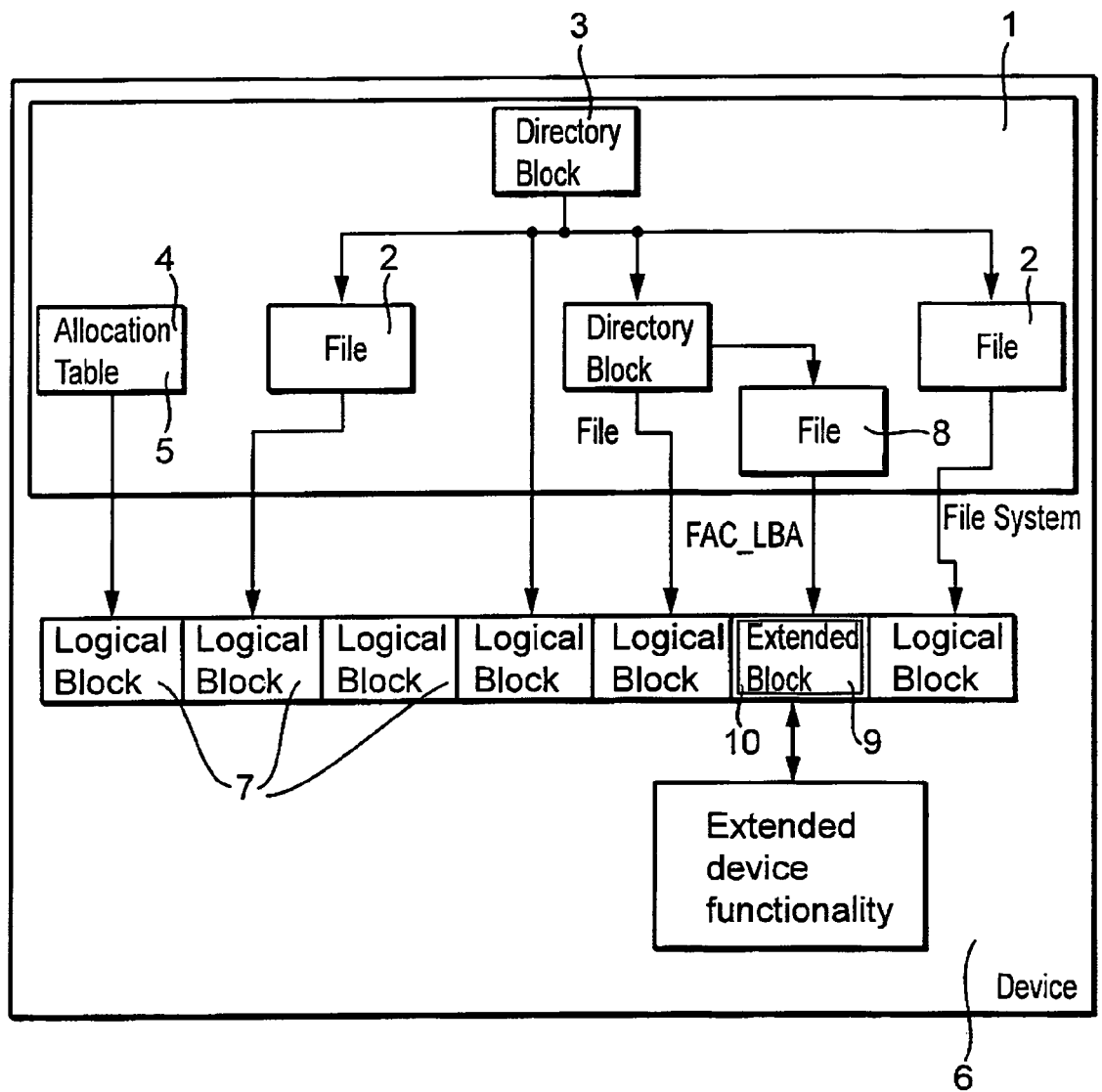
FIG. 2 shows the file system of the computer from FIG. 1 and the file system of a connected data-processing device with expanded functionality.

FIG. 2 first shows the computer 1 with its hierarchical file system, as is already known from FIG. 1. A special file 8 from the hierarchical file system is stored in a certain location in the file system of the device 6. At this certain location, there is a special data block 9, which has a special block address 10. The special data block 9 is initiated such that a special file 8 is addressed at the special block address 10. The special file 8 is stored at a certain but flexible block address 10. Thus it is written to or read from the data block 9. This is performed by means of the operating system-specific write or read commands.

The processor of the device 6 can interpret the special data block 9 and execute device-specific operations stored therein. The operations are device-specific commands, such as control commands, reading of the device status, or reading or storing device-specific data or executing cryptographic commands. The commands also include the interpretation of specific data and the storage in a device-specific way, for example, in the RAM of the device 6.

If the device 6 receives an operating system-specific write command, which addresses the special block address 10 instead of the normal block address 5, from the computer 1, the device 6 does not execute the standard write command of the operating system, but instead activates the device-specific command executor, the so-called execution handler. The execution handler interprets the special data block 9. The command transferred in the special file 8 and stored in the special data block 9 is executed by the execution handler.

If an answer to the executed device-specific command is generated, then this answer is either stored in the special data block 9 or else made available in the RAM of the device. Alternatively, instead of the answer, special status information can also be stored in the special data block 9, so that the answer to the executed command is first determined when the next read command of the operating system wants to access the special block address 10 of the special data block 9.

Figure 3:
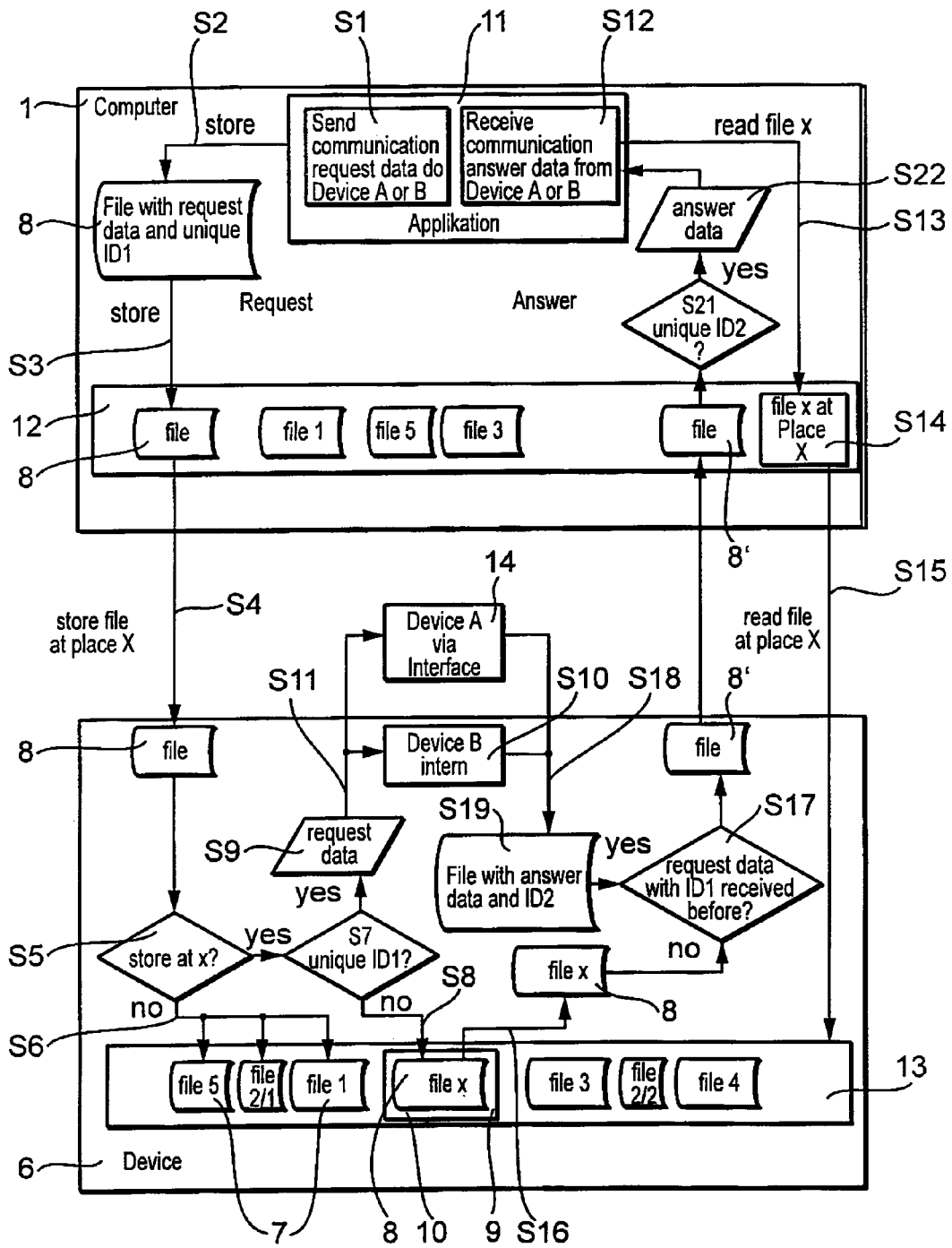
FIG. 3 is a flow chart of the method for controlling the device from FIG. 2.

FIG. 3 shows the basic flow chart of the method according to the invention. A part of the method is executed in the computer 1; the other part in the device 6.

In a first step S1, an application program 11 starts a request to the device 6. For this purpose, a device-specific command is written in a step S2 in common with an identification flag in a special file 8.

In the next step S3, the special file 8 is transferred to the file system 12 of the operating system of the computer 1 with the request to store the special file 8 in the device 6. In step S4, the operating system of the computer 1 sends the special file 8 to the device 6 by means of the write command. For addressing the special file 8, the special block address 10 is given.

In a fifth step S5, the processor of the device 6 receives the special file 8. In this step, the processor checks whether the received file 8 is addressed to the special block address 10.

If a special block address 10 is not addressed, but instead a normal block address 5 in the file, in a sixth step S6, the file 8 is stored in the memory system 13 of the device 6 in the data block 7.

However, if the special block address 10 is determined, then the processor checks in step S7 whether the special file has an identification flag. If there is no identification flag in the special file 8, in step S8 the special file 8 is stored in the special data block 9 with the special data block address 10.

If the special file 8 has an identification flag, in step S9 the device-specific command is read from the special file 8. In step S10, the device-specific command is then executed by the processor of the device 6.

Instead of the step S10, the step S11 can also be executed. The device-specific command stored in the special file 8 is transferred to an external device 14, which is connected to the device 6 via an interface. In this way, the external device 14 is controlled by the device 6. Here, a command is transferred to the external device 14 and processed there.

If an answer or a result is generated when the device-specific command is executed in step S10, the device 6 cannot automatically send the answer back to the computer 1. Instead, the application program 11 on the computer 1 must send a request to the device 6 and retrieve the answer from the device 6. This is performed in steps S12-S22.

In step S12, the application program 11 generates a request to read the special file 8 from the device 6. The request is first transmitted to the file system 12 of the computer 1. Then in step S13, the operating system-specific read command for reading a "normal" file is sent to the file system 12, because a mass-storage device is faked as the device 6 to the computer 1 and its operating system.

In step S14, the read command is converted so that the request is issued by the file system 12 to read the special file 8 from the special logical block address 10. In step S15, the operating system-specific read command is transmitted from the file system 12 to the device 6 and then received by the memory system 13 of the device 6.

In step S16, the processor of the device 6 reads the special block address 10 of the special data block 9, so that the special file 8 is prepared to be returned to the computer 1.

In step S17, the processor of the device 6 checks whether a device-specific command was executed when the operating system-specific write command of the computer 1 was executed. For this purpose, the identification flag of the special file 8 is polled. If a device-specific command was previously not sent to the device 6, an identification flag is not written into the special file 8 at the special block address 10.

If the identification flag is not contained in the file 8 or in RAM, the file 8 is sent back to the computer 1 unchanged.

If the processor of the device 6 recognizes that the identification flag is present in the special file 8, then in step S18 the answer to the executed device-specific command is requested by the processor. If the device-specific command was passed on to an external device 14, then an answer from the external device 14 is determined.

If the answer to the executed device-specific command is present, it is written in step S19 into the special file 8. Additionally, another flag is written into the special file 8. The additional flag is an answer flag or an ID, which designates the presence of an answer to an executed command. Thus, the special file 8 originally sent with the write command to the device 6 is modified and changed. Now it no longer contains the command to be executed, but instead the answer generated for the command. The modified special file 8' is now transferred to the file system 12 of the computer 1 (step S20) in the execution of the operating system-specific read command of the computer 1.

The application program 11 retrieves the modified special file 8' from the file system 12. Here, it checks in step S21 whether the answer flag has been set in the special file 8'.

With reference to the answer flag in the modified special file 8', the application program 11 recognizes in step S22 that the special file 8' contains the answer to the command to be executed. The answer is now read by the application program 11 from the special file 8' and further processed. If the answer is an error message, then this is recognized in the analysis by the application program 11.

In step S18, if an answer is not returned by the processor of the device 6, the file 8 is rewritten. In this case, however, in step S20 the answer flag is not set. The unmodified special file 8 then does not contain the answer flag. The special file 8 is still also transmitted to the computer 1, but the request in step S21 shows that the answer flag has not been set. The application program 11 recognizes that the special file 8 does not contain the answer to the command to be executed, but instead that an error has occurred.

LIST OF REFERENCE SYMBOLS

1 Computer
2 File
3 Folder
4 Allocation table
5 Block address
6 Device
7 Data block
8, 8' Special file
9 Special data block
10 Special block address
11 Application program
12 File system (of 1)
13 Memory system (of 6)
14 External device

The invention claimed is:

1. A method for exchanging commands between an application running on a computer and a data processing device having a processor, which is connected to the computer via an interface and appears to the computer as a data storage device with a corresponding file system to which an operating system on the computer is capable of writing files, the method comprising:

generating, using an application program on the computer, a device-specific command for execution by an execution handler running on the processor of the data processing device;

storing the command in a special file;

requesting the operating system of the computer to write a special file containing the device-specific command to the corresponding file system using a write operation;

after the special file is received by the data processing device, executing the device specific command contained in the special file using the execution handler running on the processor of the data processing device;

wherein, if the device specific command is of a predetermined type that requires an answer to be generated at the time of the next access of the special file by the operating system of the computer, the device specific demand is executed at the time of the next access of the special file by the operating system of the computer, and an answer to the executed device specific command is written in the special file prior to it being returned to the computer.

2. The method according to claim 1, wherein the device specific command is executed by the execution handler on the data processing device only when the special file is identified by the data processing device.

3. The method according to claim 1, further comprising generating with the processor of the connected data processing device an answer to the executed device specific command.

4. The method according to claim 3, wherein the answer to the executed command is buffered in a volatile or non volatile memory of the connected data processing device.

5. The method according to claim 3, further comprising:
requesting with the application that operating system read the special file from the connected data processing device;
receiving the read command in the connected data processing device;
storing the answer generated in the connected data processing device in the special file, which is thereby modified; and
returning the special file from the connected data processing device to the computer.

6. The method according to claim 5, further comprising:
receiving the returned special file by the computer;
recognizing that the special file contains an answer; and
reading the answer from the special file and further processing the answer in the application program.

7. The method according to claim 3, wherein the answer generated by the processor of the connected data processing device is one of a device status or an error message.

8. The method according to claim 1, wherein the special file is identified by the data processing device when the specific file is written by the operating system to a previously selected block address.

9. The method according to claim 1, wherein the connected data processing device includes a mass storage device with a corresponding file system; and wherein the special file is written onto a mass storage medium of the connected data processing device and is capable of being read from the mass storage medium of the connected data process device.

10. A method according to claim 1, wherein the special file is written by the write operation of the operating system of the computer to a predetermined block address.

11. The method of claim 1, wherein the connected data processing device does not include a data storage medium, the data processing device being further adapted for simulating to the computer a mass data storage medium but not capable of storing files written to the data processing device.

12. The method of claim 1, wherein the device specific command is unknown to the operating system with respect to the connected data processing device.

13. The method according to claim 1, wherein the processor in the data processing device writes a flag in a random access memory of the connected data processing device or in the special file if an answer to the executed command is to be generated at the next access to the file by the operating system of the computer.

14. A system for controlling a data processing device, comprising a computer with an operating system and a data processing device with a processor, which is connected to the computer via an interface and which appears to the computer as a data storage medium with a corresponding file system present at the interface, the system comprising an application program stored in the memory of the computer, the application program comprising instructions for executing on the computer for generating a device specific command, storing the command in a special file and requesting the operating system of the computer to write the special file containing the device-specific command to the corresponding file system that appears to the computer at the interface, the operating system thereby transmitting to the device the special file using a write operation of the operating system of the computer; wherein the connected data processing device is adapted to at least appear to the computer as a mass data storage medium having a file system to which the operating system is capable of writing files, receive the special file, read the device specific command from the special file after receiving the special file through the interface, and execute the device specific command, wherein, if the device specific command is of a predetermined type that requires an answer to be generated at the time of the next access of the special file by the operating system of the computer, the device specific demand is executed at the time of the next access of the special file by the operating system of the computer and an answer to the executed device specific command is written into the special file prior to it being returned to the computer.

15. A system according to claim 14, characterized in that the processor of the device is adapted for executing the device specific command only when the special file contains identification.

16. A system according to claim 14, characterized in that an answer to the executed device specific command is generated by the processor of the connected data processing device.

17. A system according to claim 16, wherein the computer is adapted for sending to the data processing device a read command of the operating system concerning the special file in response to a request from the application, the device having stored the answer generated in the device in the special file, whereby the special file is modified; and
wherein the connected data processing device is adapted for returning the special file to the computer in the execution of the read command of the operating system of the computer.

18. A system according to claim 14, wherein the connected data processing device, to which the special file is transmitted using the write operation of the operating system, comprises no mass storage medium for use by the computer for storing files.

19. A system according to claim 14, characterized in that the interface of the computer is comprised of a universal serial bus (USB) interface or a SCSI interface.

20. A system according to claim 14, characterized in that the processor for executing the read device specific command is arranged in an external device.

21. The method of claim 14, wherein the data processing device further comprises a mass data storage medium with a corresponding file system.

22. The method of claim 14, wherein the device specific command is unknown to the operating system with respect to the data processing device.

23. A data processing device for executing a device specific command generated by an application program running on a computer, the device comprising an interface for connecting to a computer, and a processor, the device being specifically adapted for causing the device to appear as a mass storage device having a corresponding file system to an interfacing computer receiving a special file containing a device specific command executable by the device and not to be executed by the computer from which the special file was received, the special file being created by the application running on the computer and received by the device through the interface using a write operation of the computer's operating system that instructs the data processing device to write the file to a previously specified storage location, the device specific command in the special file in response to receiving the special file using an execution handler running on the processor of the data processing device; and executing the device specific command contained in the special file, wherein, if the device specific command is of a predetermined type that requires an answer to be generated at the time of the next read operation of the special file by the operating system of the computer, the device specific demand is executed at the time of the next read operation of the special file by the operating system of the computer and an answer to the executed device specific command is written into the special file prior to it being returned to the computer.

24. A data processing device according to claim 23, wherein the device comprises no mass storage medium for storing files, the device merely appear to be a mass data storage device.

25. The method of claim 23, wherein the device-specific command is unknown to an operating system running on the computer with respect to the data processing device.

26. The data processing device of claim 23, wherein the device further comprises a data storage medium with a corresponding file system, the data processing device being further adapted for having the data storage medium appear at the interface as a mass data storage device for storing files written to the data processing device.

27. The data processing device of claim 23, wherein the device does not include a data storage medium, the data processing device being further adapted for simulating to an interfacing computer a mass data storage device without storing in a file system files written to the data processing device in the data storage medium.

* * * * *